United States Patent
Ye et al.

(10) Patent No.: US 7,123,669 B2
(45) Date of Patent: Oct. 17, 2006

(54) TPS DECODER IN AN ORTHOGONAL FREQUENCY DIVISION MULTIPLEXING RECEIVER

(75) Inventors: Hua Ye, Durham, NC (US); Daniel Iancu, Pleasantville, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 0 days.

(21) Appl. No.: 10/972,268

(22) Filed: Oct. 25, 2004

(65) Prior Publication Data

US 2006/0088111 A1    Apr. 27, 2006

(51) Int. Cl.
*H03D 1/00* (2006.01)

(52) U.S. Cl. ...................................... 375/341
(58) Field of Classification Search ................. 375/324, 375/316, 340, 341, 343, 332
See application file for complete search history.

(56) References Cited

U.S. PATENT DOCUMENTS

| | | | |
|---|---|---|---|
| 5,467,132 A * | 11/1995 | Fazel et al. ............ | 375/240.01 |
| 6,240,146 B1 | 5/2001 | Stott et al. | |
| 6,317,470 B1 | 11/2001 | Kroeger et al. | |
| 6,320,917 B1 | 11/2001 | Stott et al. | |
| 6,359,938 B1 | 3/2002 | Keevill et al. | |
| 6,687,315 B1 | 2/2004 | Keevill et al. | |
| 2003/0072395 A1 * | 4/2003 | Jia et al. ................. | 375/341 |
| 2004/0246888 A1 * | 12/2004 | Peron ..................... | 370/208 |
| 2005/0069054 A1 * | 3/2005 | Zhidkov ................. | 375/324 |

OTHER PUBLICATIONS

Digital Video Broadcasting (DVB) IP Datacast Baseline Specification, PSI/SI Guidelines for IPDC DVB-T/H Systems (DVB Document A079, DVB Interim Specification), Apr. 2004.

* cited by examiner

*Primary Examiner*—Emmanuel Bayard
(74) *Attorney, Agent, or Firm*—Barnes & Thornburg LLP

(57) ABSTRACT

A receiver for orthogonal frequency division multiplexing (OFDM) signals, including an A/D converter for converting received analog signals to a digital signal data stream and an OFDM demodulator for producing a first set of complex I and Q components of subcarriers from the digital signal data stream. The receiver includes a CSI estimator for estimating Channel State Information (CSI) from the sets of complex I and Q components and a TPS decoder for decoding TPS data from the sets of complex I and Q components using the CSI.

10 Claims, 3 Drawing Sheets

TPS DECODER IN AN ORTHOGONAL FREQUENCY DIVISION MULTIPLEXING RECEIVER

BACKGROUND AND SUMMARY OF THE DISCLOSURE

The present invention relates generally to communication receivers and, more specifically, to a Transmission Parameter Signaling (TPS) decoder in orthogonal frequency division multiplexing (OFDM) receivers.

The following disclosure will describe a digital video broadcasting (DVB) receiver for digital terrestrial television (DTV). The concepts are equally applicable to any other channels of transmission of DTV receivers and to other receivers or standards using orthogonal frequency division multiplexing (OFDM). These may include but not be limited to wireless standards worldwide, such as wireless LAN 802.11a and g, HIPERLAN/2, Digital Audio Broadcasting (DAB), Digital Video Broadcasting Terrestrial (DVB-T), Digital Video Broadcasting for handheld (DVB-H), 802.16 Broadband Wireless Access, etc. The European terrestrial DTV standard DVB-T (ETS 300 744) is based on COFDM technologies to combat multipath fading. See ETSI EN 300 744 V.1.4.1 "Digital Video Broadcasting (DVB): Framing structures, channel coding, and modulation for digital terrestrial television."

FIG. 1 shows a block diagram for a typical DVBT receiver. The digital signal processing for a DVBT receiver can be partitioned into three portions. The first portion 10 includes an RF front end 12, and A/D converter 14, an OFDM demodulator 16, a demodulation 18 and a pilot and TPS decoder 19. This receiver front-end signal processing portion performs receiver training, including various synchronization and channel estimation and OFDM demodulation. The second portion 20 is the DVBT receiver back-end signal processing block. It performs DVBT inner channel decoding and outer channel decoding. The third portion 30 is a MPEG Decoder. An example is shown in U.S. Pat. No. 6,687,315.

The Transmission Parameter Signaling (TPS) is a signaling scheme used in DVB type systems, such as DVB-T and the coming DVB-H, to carry signaling information to the receiver the parameters related to the transmission scheme, i.e., channel coding and modulation. In DVB-T, the TPS signaling is transmitted in parallel on 17 TPS carriers for the 2K mode and on 68 carriers for the 8K mode. Every TPS carrier in the same symbol conveys the same differentially encoded information bit. The TPS is defined over 68 consecutive OFDM symbols (one OFDM frame), each OFDM symbol conveys 1 TPS bits, and each TPS block (transmitted over 68 OFDM symbols) contains 68 bits. Every TPS carrier in an OFDM symbol is DBPSK modulated and conveys the same message. The DBPSK is initialized at the beginning of each TPS block.

In the OFDM receiver front-end signal processing 10 of FIG. 1, each received OFDM symbol is extracted from the received data sequence at proper sampling timing and symbol timing instances. The extracted OFDM symbol I/Q in time domain will go through the OFDM demodulator 16 (an FFT operation) to generate the subcarriers in frequency domain. The OFDM symbol in frequency domain will go through channel correction to remove the channel effects. At the DVB receivers, the TPS DBPSK decoding/demodulation is performed on the subcarriers after the channel correction. Each received TPS block will go through BCH error decoding to get the error corrected TPS information bits. The TPS information bits are used to set up the receiver parameters to enable the receiver to function properly.

The TPS reception must be extremely reliable and robust in the presence of noise and fading. There are two levels of protection defined for the TPS transmission scheme. First, the TPS transmission is equipped with frequency diversity: 1 TPS bit is transmitted on 17 scattered subcarriers in an OFDM symbol for the 2K mode, so if selective frequency fading exists, there is a good chance that not all of the scattered 17 subcarriers are in deep fading, it is still possible to demodulate the correct TPS bits. The BCH(67,53,t=2) error correction coding provides the second layer of error protection for each TPS block. It is designed to correct up to two error bits in one encoded TPS block.

However, it is found in DVB system simulation that even with the above two levels of protection for TPS transmission as defined in DVB specification, TPS reception failures still occur intermittently in severe fading and high noise conditions. One example is that the conventional TPS reception algorithm fails sometimes at SNR=6 dB and Rayleigh fading channel.

Due to computational complexity and high MIPs required for the DVBT receiver, until recently, DVBT receivers have been implemented in hardware using ASICs. In the case of multi-protocol communication systems, the hardware implementation becomes less attractive due to extra chip cost and PC board area consumed. In this disclosure, an improved software implementation of a DVBT receiver is described. In this design, all functions associated with the DVBT receiver may be implemented in software in the Sandbridge Technologies Multithreaded SB9600 processor. The device may be used in hand-held devices, such as mobile phones and PDAs.

The present receiver includes an A/D converter for converting received analog signals to a digital signal data stream and an OFDM demodulator for producing a set of complex I and Q components of subcarriers from the digital signal data stream. A CSI estimator for estimating Channel State Information (CSI) from the sets of complex I and Q components and a TPS decoder for decoding TPS data from the sets of complex I and Q components using the CSI are provided. The receiver may also include a Viterbi decoder for decoding the sets of complex I and Q components using the CSI.

A method of decoding TPS data in a receiver includes estimating CSI from the sets of complex I and Q components of subcarriers of an OFDM signal demodulated in the receiver; and decoding TPS data in the sets of complex I and Q components of subcarriers using the CSI. The method may further include Viterbi decoding the sets of complex I and Q components using the CSI.

These and other aspects of the present disclosure will become apparent from the following detailed description of the disclosure, when considered in conjunction with accompanying drawings.

DETAILED DESCRIPTION OF THE PREFERRED EMBODIMENTS

Figure 1:
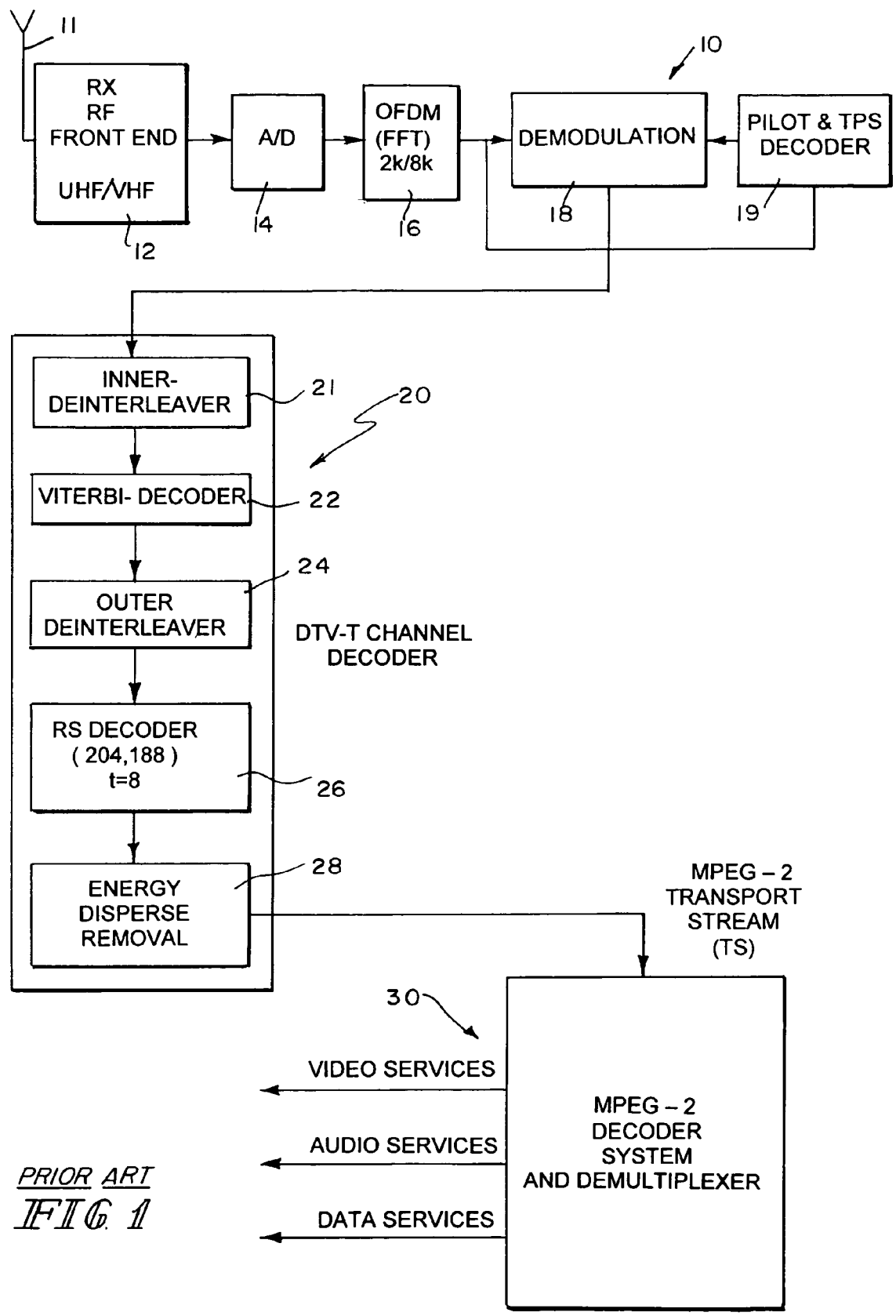
FIG. 1 is a block diagram of a digital video broadcasting terrestrial receiver, according to the prior art.

A digital video broadcasting/terrestrial receiver of the prior art is illustrated in FIG. 1. The first portion 10 includes an RF receiver front end 12 for receiving UHF and VHF signals from antenna 11 and A/D converter 14. The signals are then provided to an OFDM demodulator 16. The output of the OFDM demodulator 16 is connected to demodulator 18 and pilot and TPS decoder 19. This block performs receiver training, including various synchronization and channel estimation and the OFDM demodulation.

The various signals (including, for example, the complex I and Q components of the digital signal) are provided to the receiver back-end signal processing block 20. This includes inner-deinterleaver 21, a Viterbi decoder 22, an outer deinterleaver 24, an RS decoder 65 and an energy disperse removal 28. The output of the back-end signal processing block 20 is provided to an MPEG decoder/demultiplexer portion 30. The output signals may be, for example, video services, audio services and data services.

Figure 2:
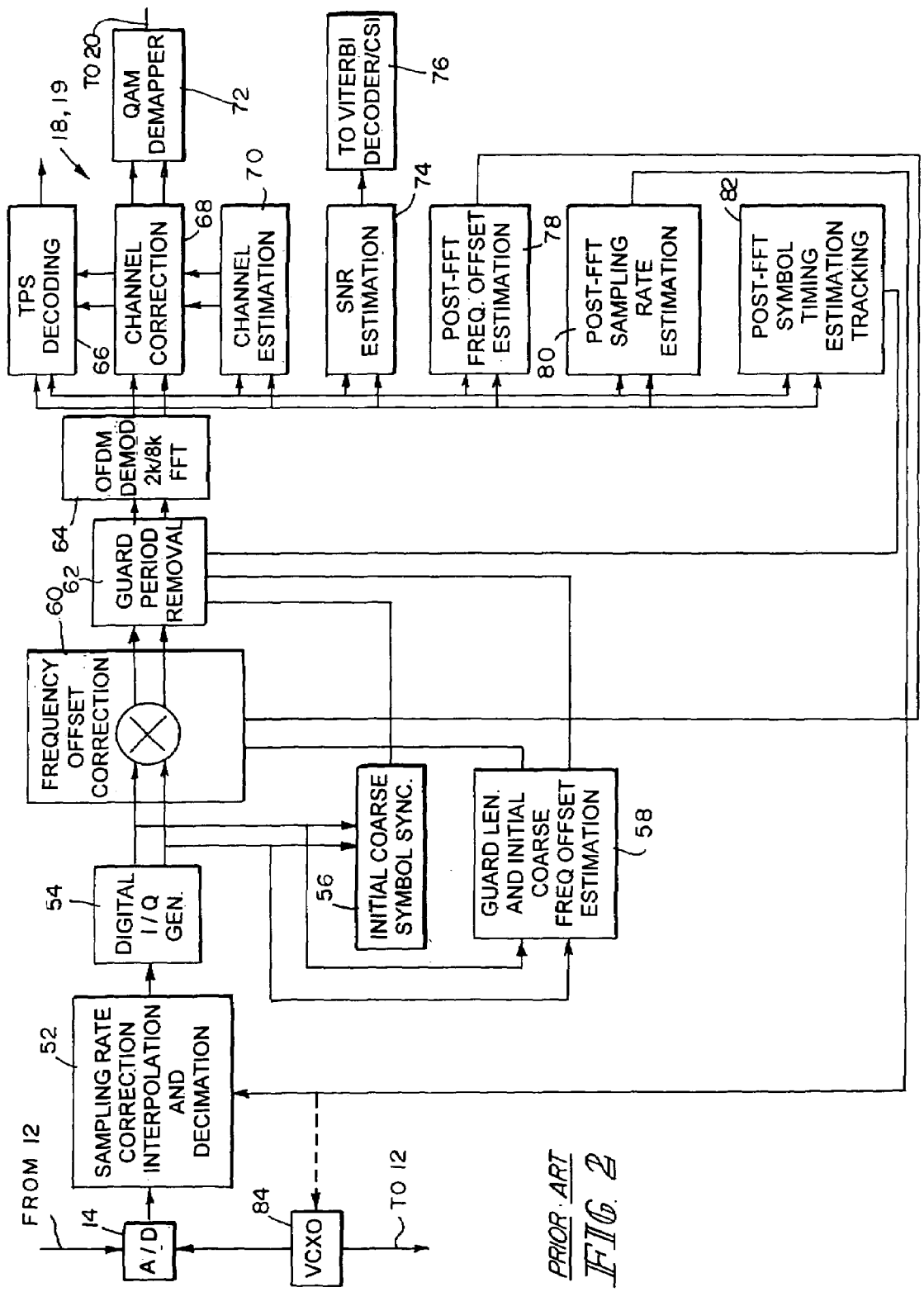
FIG. 2 is a block diagram of a portion of an orthogonal frequency division multiplexing receiver front-end processing portion of the prior art.

A more detailed description of the front end 10 is shown in FIG. 2. The RF processed analog signal from RF front-end receiver 12 is provided to the A/D converter 14. The digital signal is provided to a sampling rate correction interpolation and decimation process 52. The output of 52 is then provided to a digital I/Q generator 54, which generates the complex I and Q components or signals required for the OFDM demodulator 64. The complex I/Q signal is provided to the initial coarse symbol synchronization portion 56 and to the guard segment length detector and coarse frequency offset estimator 58. The carrier frequency offset may be corrected digitally by properly de-rotating the I/Q signals at the frequency offset correction 60. This uses the initial coarse frequency offset estimation of 58. The guard segment length can be detected at 58 and the corresponding guard segment period removed at 62 from the I/Q signal stream.

The digital signal data stream (without the guard segments) is then processed by the FFT demodulator 54, which performs a fast Fourier Frequency Transformation (FFT) on the complex I/Q signals. A 2048 point complex FFT is performed for the 2K mode, and a 8192 point complex FFT is performed for an 8K mode. These are the modes used in the previously mentioned standard.

The demodulated OFDM symbols, as complex I/Q components, are provided to the TPS decoder 66, the channel correction 68 and channel estimation 70. The channel correction 68, having input also from the channel estimation 70, provides an output for the QAM demapper 72, which provides the output to the receiver back-end processing block 20. The I/Q signals out of the OFDM demodulator 64 are also provided to the SNR estimator 74, which provides input to the Viterbi decoder via processor 76. The Viterbi input processor 76 may include a CSI estimator for estimating CSI from the sets of complex I and Q components, as shown, for example, in U.S. Pat. Nos. 6,240,146; 6,317,470; 6,320,917 and 6,687,315.

The demodulated I/Q signals are also provided to the post-FFT frequency offset estimation 78, which provides a feedback to the frequency offset correction portion 60. The demodulated I/Q signals are also provided to the post-FFT sampling rate estimator 80, which provides a feedback signal to the sampling rate correction interpolation and decimation portion 52. The demodulated I/Q signals are provided to the post-FFT symbol timing estimation tracking portion 82, which provides a feedback to the guard period removal 62.

It should also be noted that the post-FFT sampling rate estimation circuit 80 also provides a signal to the voltage control oscillator 84, which provides a signal back to the RF receiver 12 for the adjustment of the final LO frequency of the analog receiver circuit 12 and to the A/D converter 14 for adjusting A/D sampling rate.

The present disclosure, as will be noted below, will increase the reliability and robustness of the TPS reception, especially at low SNR and severe fading, by using the CSI.

As noted in the Background and Summary of the Disclosure, the TPS signaling is transmitted in parallel on 17 TPS carriers for the 2K mode and on 68 carriers for the 8K mode. Every TPS carrier in the same symbol conveys the same differentially encoded information bit. As an example, Table 1 shows the TPS carrier indices for DVB-T 2K mode:

TABLE 1

Carrier Indices for TPS Carriers for DVB-T 2K Mode 34 50 209 346 413 569 595 688 790 901 1073 1219 1262 1286 1469 1594 1687

The TPS is defined over 68 consecutive OFDM symbols (one OFDM frame), each OFDM symbol conveys 1 TPS bit, and each TPS block (transmitted over 68 OFDM symbols) contains 68 bits defined as follows:
 1 initialization bit;
 16 synchronization bits;
 37 information bits;
 14 redundancy bits for error protection (BCH encoded).

The 37 information bits convey information on:
 a) Modulation parameters for setting the receiver, such as QAM demapper.
 b) Hierarchy information.
 c) Guard interval.
 d) Inner code rates.
 e) Transmission modes.
 f) Frame number.
 g) Cell identification.

DVB-H further defines a few more bits in the reserved bits for DVB-T to signal the presence of timing slicing, MPE-FEC, 4K mode and the use of in-depth symbol interleaver.

Every TPS carrier in an OFDM symbol is DBPSK modulated and conveys the same message. The DBPSK is initialized at the beginning of each TPS block. The following rule applies for sending TPS bit $S_l$ by differential modulation of carrier k of symbol l (l>0) in frame m:
 1) If $S_l=0$, then $Re\{C_{m,l,k}\}=Re\{C_{m,l-1,k}\}$; $Im\{C_{m,l,k}\}=0$;
 2) If $S_l=1$, then $Re\{C_{m,l,k}\}=-Re\{C_{m,l-1,k}\}$; $Im\{C_{m,l,k}\}=0$;

The absolute modulation of the TPS carriers in the first symbol in a TPS block is derived from the reference sequence $w_k$ as follows:

$$Re\{C_{m,l,k}\}=2(1/2-w_k)$$

$$Im\{C_{m,l,k}\}=0$$

At the DVB receivers, the TPS DBPSK demodulation is performed on the subcarriers after the channel correction. Based on the TPS DBPSK modulation scheme described above, a conventional algorithm to demodulate the TPS bits can be done as follows:

For the channel corrected OFDM symbol l (l>0) in frame m, the $k^{th}$ subcarrier can be notated as $c'_{m,l,k}$, for all the k listed in Table 1 that are used to carry TPS:

$$Sum_l = \sum_k \text{Re}\{c'_{m,l,k}\}$$

$$Sum_{l-1} = \sum_k \text{Re}\{c'_{m,l-1,k}\}$$

If $(Sum_l \times Sum_{l-1}) >= 0$, the current TPS bit carried on OFDM symbol l is decoded as:
$S'_l = 0$;
Else $S'_l = 1$.
A sliding window of 16 bits will move through the received TPS bits in order to search for TPS synchronization sequence. Once TPS synchronization sequence is detected, more TPS bits will be gathered until the current TPS block (68 bits) is received. Each received TPS block will go through BCH error decoding to get the error corrected TPS information bits. The TPS information bits are used to set up the receiver parameters to enable the receiver to function properly.

It is found in DVB system simulation that even with the above two levels of protection for TPS transmission as defined in DVB specification, TPS reception failures still occur intermittently in severe fading and high noise conditions. One example is that the conventional TPS reception algorithm described above fails sometimes at SNR=6 dB and Rayleigh fading channel. The present system applies CSI to the TPS demodulation algorithm. CSI information greatly improves the reliability and robustness of TPS reception. It is found in simulation that when CSI is used properly in the TPS demodulation, TPS signaling can be received reliably at extremely low SNR and severe fading.

In the presence of frequency selective fading, the 17 TPS bearing subcarriers in an OFDM symbol (2K mode) may be faded selectively. Generally speaking, the more a subcarrier is faded, the less reliable the carried information may become. In the conventional TPS demodulation algorithm as described above, equal weighting is applied to all the 17 subcarriers in the calculation of $Sum_l$ and $Sum_{l-1}$, i.e., all the 17 subcarriers contribute equally to the TPS bit decision, while some of the subcarriers may contribute unreliable information due to deep fading and noise.

Figure 3:
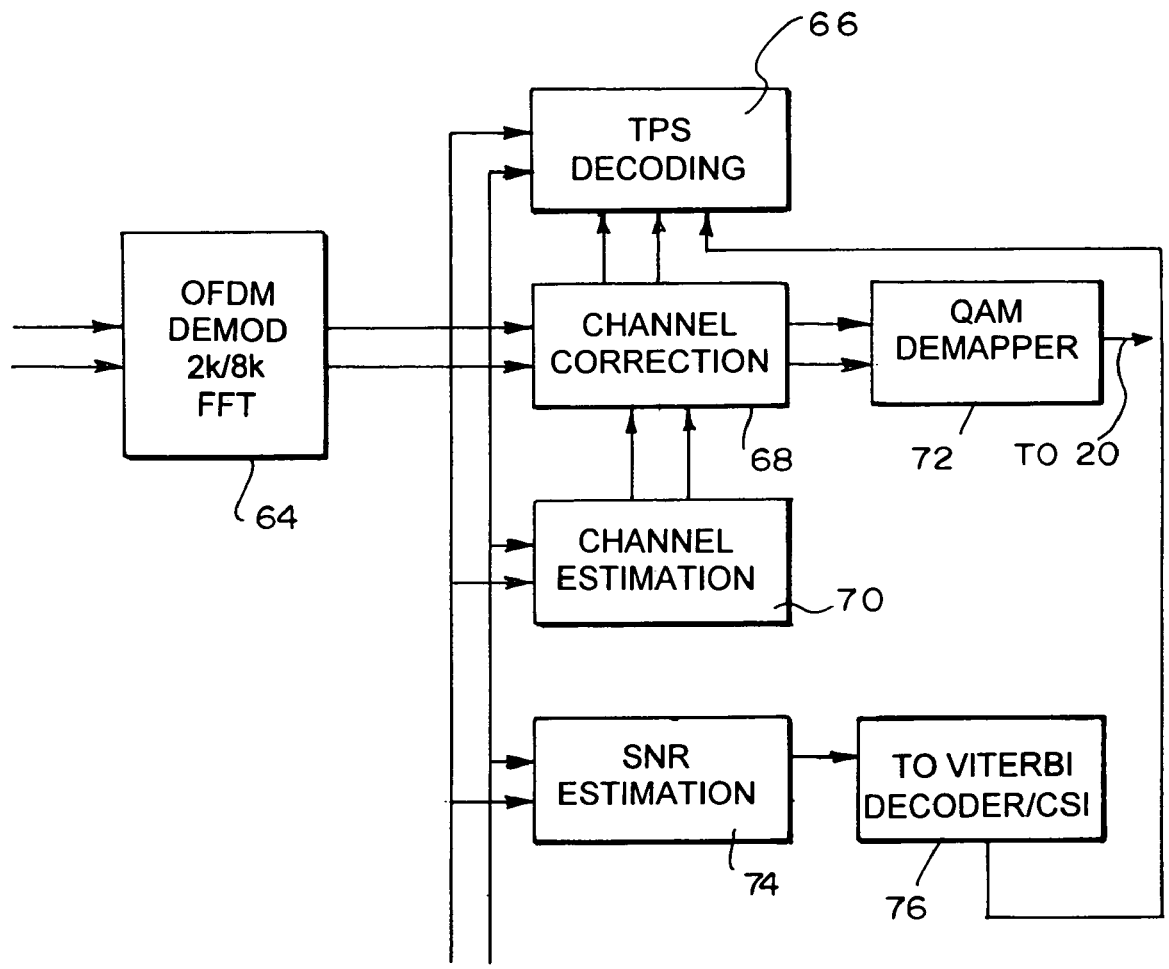
FIG. 3 is a block diagram of a portion of an orthogonal frequency division multiplexing receiver front-end processing portion according to the present disclosure.

A CSI weighted TPS demodulation scheme of the present disclosure improves reliability. The CSI is an estimate of reliability for each subcarrier in an OFDM symbol. CSI has been applied to Viterbi decoding algorithm to improve the BER for DVB systems as previously noted, so CSI information should be readily available in a DVB receiver. As illustrated in FIG. 3, the CSI in the Viterbi input processor 76 is provided to the TPS decoder 66. There are many ways to compute CSI, and all of them should be applicable here. In an embodiment, the CSI is calculated as described below:

For the $k^{th}$ subcarrier in the received OFDM symbol l, the estimated channel frequency response is $F_{k,l}$, then CSI for the same subcarrier can be estimated as:

$$CSI_{k,l} = \sqrt{\text{Re}\{F_{k,l}\} \times \text{Re}\{F_{k,l}\} + \text{Im}\{F_{k,l}\} \times \text{Im}\{F_{k,l}\}}$$

where Re and Im correspond to the complex components I and Q. Thus, $CSI_{k,l}$ can be estimated as the magnitude of the channel frequency response.

In the proposed CSI weighted TPS DBPSK demodulation algorithm, the $Sum_l$ and $Sum_{l-1}$ can be calculated as follows:

$$Sum_l = \sum_k (\text{Re}\{c'_{m,l,k}\} \times CSI_{k,l})$$

$$Sum_{l-1} = \sum_k (\text{Re}\{c'_{m,l-1,k}\} \times CSI_{k,l-1}).$$

The subcarriers that fall into deep nulls (with very low CSI weighting) will be much noisier than the ones at the peak (with high CSI weighting), so the above CSI weighting will allow the more reliable subcarriers to contribute more than the less reliable subcarriers to the TPS bit decision.

In DVB-T end to end simulation, the CSI weighted TPS demodulation is found to be able to work reliably at extremely low SNR and severe fading. For example, for awgn noise channel, the TPS reception can work at SNR of around −3 dB. For Rayleigh fading channel as defined in DVB-T specification, TPS reception can work reliably at SNR of around 0.83 dB. This performance is unreachable for conventional equal weighting TPS demodulation.

The above CSI enhanced TPS reception algorithm is an important enabling factor for the MIMO-type (multi-input, multi-output) DVB receivers, where antenna diversity can further allow DVB receivers to operate at extremely low SNR and severe fading.

Although the present disclosure has been described and illustrated in detail, it is to be clearly understood that this is done by way of illustration and example only and is not to be taken by way of limitation. The scope of the present disclosure is to be limited only by the terms of the appended claims.

What is claimed is:

1. A receiver comprising:
    an A/D converter for converting received analog signals to a digital signal data stream;
    an Orthogonal Frequency Division Multiplexing (OFDM) demodulator for producing a set of complex I and Q components of subcarriers from the digital signal data stream;
    a CSI estimator for estimating Channel State Information (CSI) from the sets of complex I and Q components; and
    a TPS decoder for decoding Transmission Parameter Signaling (TPS) data from the sets of complex I and Q components using the CSI.

2. The receiver according to claim 1, including a Viterbi decoder for decoding the sets of complex I and Q components using the CSI.

3. The receiver according to claim 1, wherein the receiver is a digital video broadcasting receiver.

4. The receiver according to claim 1, a processor programmed to operate as the OFDM demodulator, the CSI estimator and the TPS decoder.

5. A method of decoding Transmission Parameter Signaling (TPS) data in a receiver, comprising:
    estimating Channel State Information (CSI) from the sets of complex I and Q components of subcarriers of a Orthogonal Frequency Division Multiplexing (OFDM) signal demodulated in the receiver; and
    decoding TPS data in the sets of complex I and Q components of subcarriers using the CSI.

6. The method according to claim 5, including Viterbi decoding the sets of complex I and Q components using the CSI.

7. The receiver according to claim 1, including a SNR stage providing an input to the CSI estimator.

8. The receiver according to claim 1, wherein the CSI estimator provides the CSI as a function of the I and Q components' quality.

9. The method according to claim 5, including determining quality of the I and Q components' and using the component quality in the CSI estimating.

10. The method according to claim after claim 5, wherein the CSI estimating is a function of the I and Q components' quality.

* * * * *